United States Patent
Hobbs (10) Patent No.: US 8,954,876 B1
(45) Date of Patent: Feb. 10, 2015

(54) METHOD AND APPARATUS FOR PROVIDING A SESSION STATUS INDICATOR

(75) Inventor: David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 1370 days.

(21) Appl. No.: 12/284,963

(22) Filed: Sep. 26, 2008

Related U.S. Application Data (60) Provisional application No. 60/978,705, filed on Oct. 9, 2007.

(51) Int. Cl.
  *G06F 3/00* (2006.01)
(52) U.S. Cl.
  USPC .......................................... 715/772
(58) Field of Classification Search
  CPC ................. H04N 5/44543; H04L 12/2458
  USPC ............... 715/772, 733, 744, 751, 753, 757; 345/555
  See application file for complete search history.

(56) References Cited

U.S. PATENT DOCUMENTS

| | | | | |
|---|---|---|---|---|
| 5,278,946 A | * | 1/1994 | Shimada et al. | 706/53 |
| 5,280,574 A | * | 1/1994 | Mizuta et al. | 715/205 |
| 5,528,284 A | * | 6/1996 | Iwami et al. | 348/14.15 |
| 5,596,364 A | * | 1/1997 | Wolf et al. | 348/192 |
| 5,608,858 A | * | 3/1997 | Kurosu et al. | 715/209 |
| 5,859,636 A | * | 1/1999 | Pandit | 715/204 |
| 5,940,830 A | * | 8/1999 | Ochitani | 1/1 |
| 5,963,655 A | * | 10/1999 | Sakurai | 382/113 |
| 6,011,868 A | * | 1/2000 | van den Branden et al. | 382/233 |
| 6,052,687 A | * | 4/2000 | Miura et al. | 1/1 |
| 6,278,433 B2 | * | 8/2001 | Narui | 345/581 |
| 6,525,746 B1 | * | 2/2003 | Lau et al. | 715/725 |
| 6,532,024 B1 | * | 3/2003 | Everett et al. | 715/716 |
| 6,664,969 B1 | * | 12/2003 | Emerson et al. | 345/544 |
| 6,760,482 B1 | * | 7/2004 | Taubman | 382/240 |
| 6,874,131 B2 | * | 3/2005 | Blumberg | 715/205 |
| 6,948,127 B1 | * | 9/2005 | Zhu et al. | 715/719 |
| 7,044,395 B1 | * | 5/2006 | Davis et al. | 235/494 |
| 7,076,735 B2 | * | 7/2006 | Callegari | 715/733 |
| 7,222,306 B2 | * | 5/2007 | Kaasila et al. | 715/801 |
| 7,274,368 B1 | * | 9/2007 | Keslin | 345/522 |
| 7,281,213 B2 | * | 10/2007 | Callegari | 715/733 |

(Continued)

OTHER PUBLICATIONS

Hewlett Packard Datasheet Document No. L.P. 4AA0-9687ENW, "HP Remote Graphics Software", Jul. 2007, USA, pp. 1-4.

(Continued)

*Primary Examiner* — Ryan Pitaro
(74) *Attorney, Agent, or Firm* — Moser Taboada (57) ABSTRACT

A method and apparatus for generating display status information for a computer in a remote computing environment. The method comprises receiving, from a remote computer, a first data set associated with a display image, where the first data set comprises an encoding of a source image to be rendered at the remote computer; decoding, at a client computer, the first data set to generate a first portion of the display image; and determining, from the first data set, a perceptual quality level for the display image. The apparatus comprises: a client resource for receiving display data and decoding the display data; a session monitor for determining a state of the display data decoded by the client resource; and a user interface for presenting the display status information, the display status information comprising the state of the display data.

18 Claims, 4 Drawing Sheets

(56) References Cited

U.S. PATENT DOCUMENTS

| | | | |
|---|---|---|---|
| 7,362,804 B2* | 4/2008 | Novotny et al. | 375/240.01 |
| 7,401,116 B1* | 7/2008 | Chalfin et al. | 709/203 |
| 7,430,219 B2* | 9/2008 | Itoh et al. | 370/465 |
| 7,564,461 B1* | 7/2009 | Ramsey | 345/522 |
| 7,574,653 B2* | 8/2009 | Croney et al. | 715/249 |
| 7,596,278 B2* | 9/2009 | Basse | 382/236 |
| 7,659,907 B1* | 2/2010 | Chalfin et al. | 345/555 |
| 7,716,683 B2* | 5/2010 | Zhang et al. | 719/323 |
| 7,730,157 B2* | 6/2010 | Baratto et al. | 709/217 |
| 7,844,442 B2* | 11/2010 | Tzruya | 703/22 |
| 7,844,848 B1* | 11/2010 | Hobbs | 713/400 |
| 7,868,893 B2* | 1/2011 | Feth et al. | 345/522 |
| 7,929,453 B2* | 4/2011 | Parolkar et al. | 370/252 |
| 8,064,635 B2* | 11/2011 | Baudry et al. | 382/100 |
| 8,233,728 B2* | 7/2012 | Singhal et al. | 382/232 |
| 8,312,133 B2* | 11/2012 | Kurosawa | 709/224 |
| 2002/0054044 A1* | 5/2002 | Lu et al. | 345/536 |
| 2003/0117511 A1* | 6/2003 | Belz et al. | 348/333.11 |
| 2003/0177172 A1* | 9/2003 | Duursma et al. | 709/203 |
| 2003/0191860 A1* | 10/2003 | Gadepalli et al. | 709/247 |
| 2003/0212811 A1* | 11/2003 | Thornton | 709/231 |
| 2004/0010622 A1* | 1/2004 | O'Neill et al. | 709/247 |
| 2004/0062305 A1* | 4/2004 | Dambrackas | 375/240.01 |
| 2004/0075665 A1* | 4/2004 | Ito | 345/581 |
| 2004/0114817 A1* | 6/2004 | Jayant et al. | 382/239 |
| 2004/0240752 A1* | 12/2004 | Dobbs et al. | 382/276 |
| 2005/0114395 A1 | 5/2005 | Muralidharan | |
| 2005/0166050 A1* | 7/2005 | Kosaki | 713/171 |
| 2006/0034326 A1* | 2/2006 | Anderson et al. | 370/466 |
| 2006/0290997 A1* | 12/2006 | Okada et al. | 358/403 |
| 2008/0049030 A1* | 2/2008 | Keslin | 345/522 |
| 2008/0143734 A1* | 6/2008 | Ishii et al. | 345/581 |
| 2008/0196077 A1* | 8/2008 | Basse | 725/116 |
| 2008/0288977 A1* | 11/2008 | Howcroft et al. | 725/37 |
| 2009/0074315 A1* | 3/2009 | Niu | 382/251 |
| 2009/0164933 A1* | 6/2009 | Pederson et al. | 715/772 |
| 2009/0249393 A1* | 10/2009 | Shelton et al. | 725/39 |
| 2009/0320077 A1* | 12/2009 | Gazdzinski | 725/62 |
| 2010/0017744 A1* | 1/2010 | Kikuchi et al. | 715/781 |
| 2010/0058401 A1* | 3/2010 | Beyabani | 725/93 |
| 2010/0166251 A1* | 7/2010 | Baudry et al. | 382/100 |
| 2011/0010629 A1* | 1/2011 | Castro et al. | 715/732 |

OTHER PUBLICATIONS

Tektronix Corporation Application Note 25W-14589-0, "MPEG-2 Decoder Design & Test", Apr. 2001, USA, pp. 1-8.

* cited by examiner

METHOD AND APPARATUS FOR PROVIDING A SESSION STATUS INDICATOR

CROSS-REFERENCE TO RELATED APPLICATIONS

This application claims benefit of U.S. provisional patent application Ser. No. 60/978,705, filed Oct. 9, 2007, which is herein incorporated by reference.

BACKGROUND OF THE INVENTION

1. Field of the Invention

Embodiments of the invention generally relate to a remote computing environment and, more particularly, to a method and apparatus for displaying status information associated with the presentation of an image at a remote computer.

2. Background

Existing computer and network infrastructure supports the remote display of graphic information in applications ranging from web browsing, video conferencing and media streaming to remote computing using communication protocols such as HTTP, Virtual Network Computing (VNC) and Remote Desktop Protocol.

In fact, recent user dependence on graphics information communicated from a non-local computer has spurred a need for methods of informing the user of the status of the communications between the computer serving the information and the local client computer system displaying the information.

As one example, MICROSOFT INTERNET EXPLORER comprises a page load status bar graph to inform a user of the projected time remaining before a web page upload has completed. As another example, SUN RAY, from Sun Microsystems, enables a Network Status Display initiated when a user presses a combination of keys at the remote terminal.

Some products notify the user when network performance drops below a defined threshold. For example, Hewlett Packard's Remote Graphics Software (RGS) for Workstations displays a connection warning to alert a user when the RGS network update rate falls below user defined response time to indicate possible stale display information.

As the user requirements for remote display systems gain sophistication, so the need for improved communication status indications increases.

SUMMARY OF THE INVENTION

Embodiments of the invention include a method and apparatus for generating display status information for a computer in a remote computing environment. Embodiments of the method comprise receiving, from a remote computer, a first data set associated with a display image, where the first data set comprises an encoding of a source image to be rendered at the remote computer; decoding, at a client computer, the first data set to generate a first portion of the display image; and determining, from the first data set, a perceptual quality level for the display image.

Embodiments of the apparatus comprise: a client resource for receiving display data and decoding the display data; a session monitor for determining a state of the display data decoded by the client resource; and a user interface for presenting the display status information, the display status information comprising the state of the display data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates selected details of an embodiment of a host computer comprising an image encoder;

DETAILED DESCRIPTION

Figure 1:
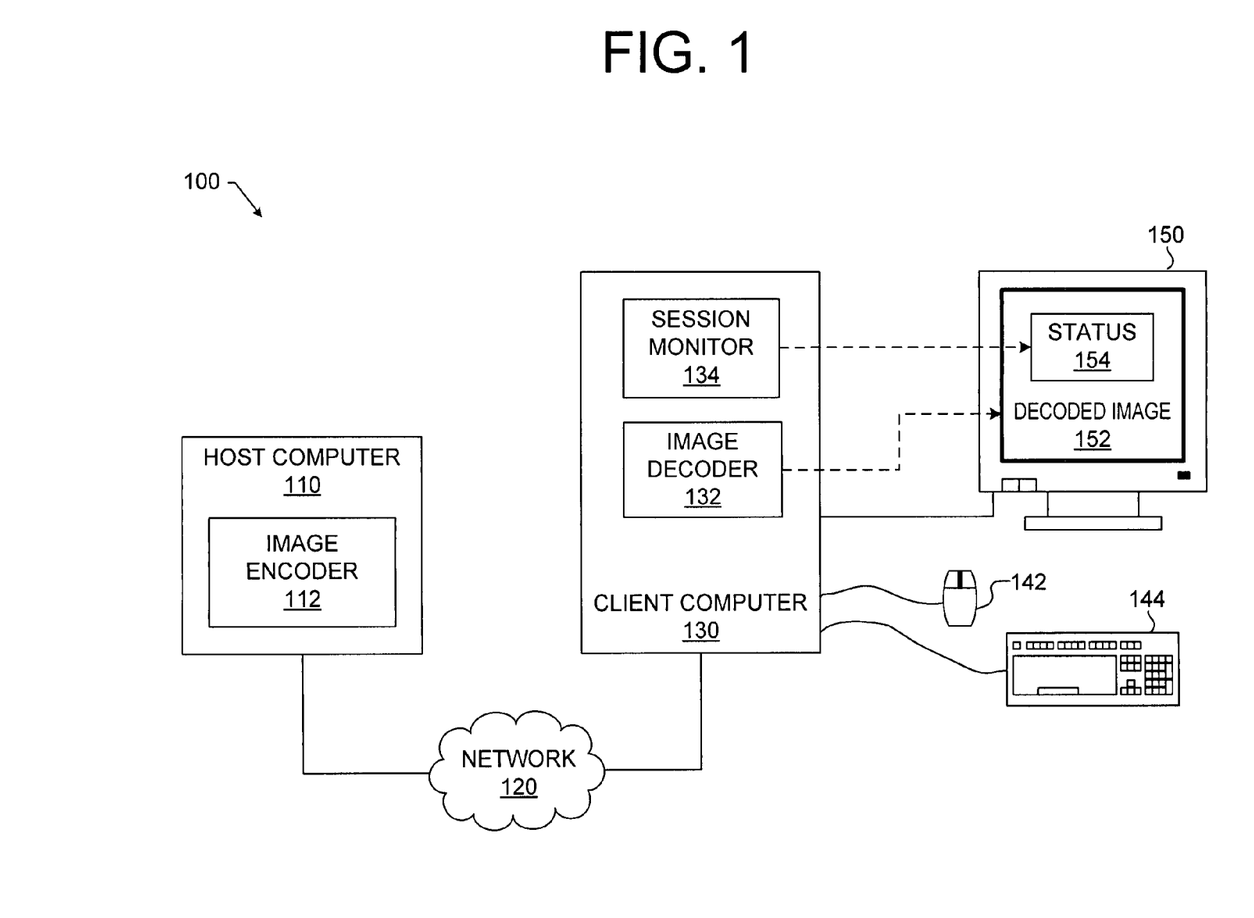
FIG. 1 illustrates selected details of an embodiment of a system comprising a client computer with display and peripherals connected to a host computer by a network.

During a remote computing session, a source image such as a dynamic desktop display image sourced by, stored on and/or created on a host computer (such as computer 110 of FIG. 1) is transmitted as an encoded source image stream to a second computer (such as client computer 130 of FIG. 1) for output such as to a display (such as display 150 of FIG. 1). According to various embodiments, the source image (also referred to herein as a display image) is one or more of: a frame sequence, such as a video frame sequence; a portion of a larger image sequence, such as a bounded region of the larger image sequence; a layer of a complex image sequence, such as a layer based on spatial and/or temporal features of the complex image sequence, the features including contrast, color, content, and/or other suitable parameters; a video layer, a text layer or a background layer; and any combination of the foregoing. The host computer encodes the source image for transmission (producing an encoded image stream (also referred to herein as a data set)), and the client computer decodes the encoded image stream (producing a decoded image stream) to produce at least a portion of the display image.

In various embodiments, the client computer monitors the perceptual quality of the decoded image stream and/or the images rendered there from, for example as compared to one or more attributes of the source image, including attributes such as source timing, encoding quality metrics, sequence information or device input response timing. In various embodiments, a perceptual quality level is presented on the display, for example, using a cursor attribute or overlay image. In various embodiments, the presentation format of a display overlay image is associated with various quality thresholds.

FIG. 1 is a block diagram of system 100 which is an exemplary embodiment of a remote display system comprising host computer 110 coupled to client computer 130 by network 120. This figure only portrays one variation of the myriad of possible network configurations. For example, system 100 may comprise numerous host computers 110 or several client computers 130. For simplicity and clarity, only one host computer 110 and only one computer 130 are depicted and described. Embodiments of the invention, as shall be discussed below, include a method and apparatus for indicating session status associated with a display connection between host and client computers.

Network 120 comprises a communication system (e.g., the Internet, LAN, WAN, and the like) that connects computer systems completely by wire, cable, fiber optic, and/or wireless links facilitated by various types of well-known network elements, such as hubs, switches, routers, and the like. The network 120 may employ various well-known protocols to communicate information amongst the network resources. For example, in an embodiment, network 120 is part of the Internet.

Figure 3:
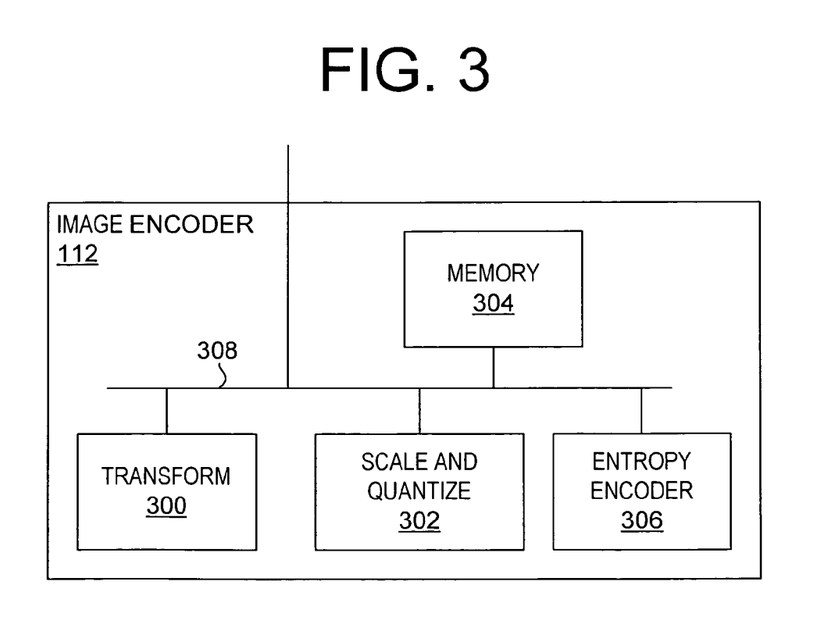
FIG. 3 illustrates selected details of an embodiment of an image encoder.

Host computer 110 is, generally, a computer or system of computers that has been designated for running user software applications and generating graphics information in the form of pixel data, graphics commands, video information and the like. For example, in an embodiment, host computer 110 executes application software and generates one or more source display images and/or source display image streams, for example with the aid of a Graphics Processing Unit (GPU) and/or rendering software such as DIRECTX, OPENGL or the like. Host computer 110 encodes the host image stream using image encoder 112 and transmits the encoded display stream to client computer 130. Generally, image encoder 112 is an image encoder that uses one or more encoding techniques to encode an image stream such as a stream of pixels or drawing commands from the CPU of host computer 110. Select details of an embodiment of encoder 112 are depicted in FIG. 3. In some embodiments, host computer 110 also transmits additional display or performance information including at least one of frame sequence information, progressive build state information, image encoding parameters, image encoding quality metrics, network performance information or source image timing information used by client computer 130 to determine perceptual quality. Select details of an embodiment of host computer 110 are depicted in FIG. 2.

Client computer 130 is, generally, a computing device enabled to display image data and connect to network 120. For example, in an embodiment client computer 130 is a terminal in a networked computer system (e.g., remote computing system 100). Such remote terminals include thin clients, personal computers, workstations, Personal Digital Assistants (PDAs), wireless devices, and the like. In an embodiment, computer 130 decodes the encoded image stream using image decoder 132 and presents the decoded image stream for display as decoded image 152 on display 150. In an embodiment, image 152 is a remote Graphical User Interface (GUI) representation of the GUI associated with host computer 110. In another embodiment, image 152 is a video sequence display.

Figure 5:
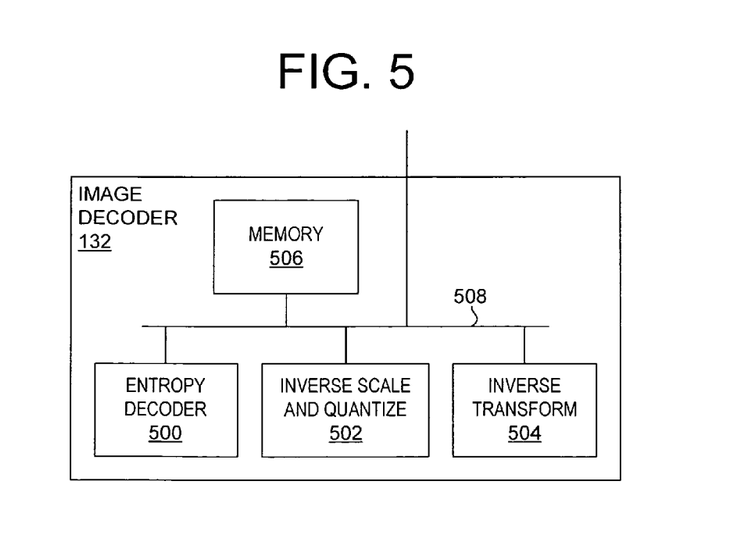
FIG. 5 illustrates selected details of an embodiment of an image decoder.

Image decoder 132 is generally an image decoder that converts an encoded image stream (a data set) received from host computer 110 to a decompressed image format such as a raster image format suitable for transmission to a display. Select details of an embodiment of decoder 132 are depicted in FIG. 5. In some embodiments, computer 130 also comprises one or more peripheral interfaces for the connection of peripheral devices such as mouse 142 and keyboard 144. In various such embodiments, host computer 110 responds to input events such as mouse or keyboard events initiated by mouse 142 and keyboard 144.

Figure 4:
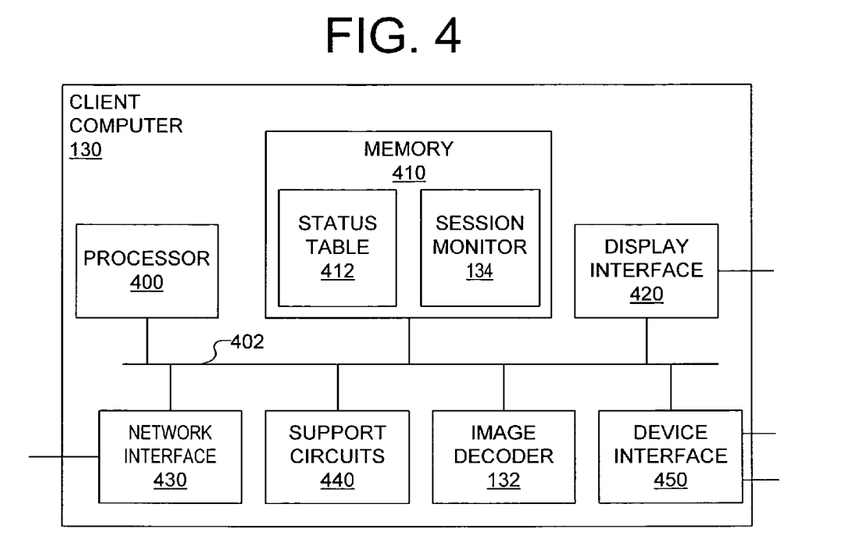
FIG. 4 illustrates selected details of an embodiment of a client computer comprising an image decoder and session status monitor.

In an embodiment, session monitor 134 comprises a logic sequencer or a set of machine-executable instructions enabled to perform session monitoring as disclosed herein. In select embodiments, session monitor 134 uses display information, encoding quality metrics or performance information received from host computer 110 or image information such as progressive refinement level, image type and/or region identification information provided by decoder 132 to determine perceptual quality levels and/or image status for presentation to a user, for example as a display overlay status window 154. An embodiment of a session monitoring and indication method is illustrated as method 600 in FIG. 6. Select details of an embodiment of client computer 130 are depicted in FIG. 4.

Client computer 130 of system 100 is coupled to network 120, mouse 142, keyboard 144 and display 150. The mouse 142 is an input device that enables the user to move a cursor around desktop decoded image 152 for interaction with applications while keyboard 144 is an input device having typical keyboard elements such as alphanumeric keys, control keys and/or status indicators. In various embodiments, mouse 142 and keyboard 144 connect to computer 130 using one or more peripheral bus interfaces such as one or more Universal Serial Bus (USB), FIREWIRE, BLUETOOTH, PS/2 interfaces or the like. In one or more embodiments, a device such as mouse 142 or keyboard 144 is used (by a user of computer 130) to request additional status information in the presence of overlay status window 154, for example by typing a hotkey sequence. In some such embodiments, computer 130 forwards the command to management functions of host computer 110. Host computer 110 then returns additional information such as encoding information, network information or the like either embedded in the image stream or out of band for presentation as an updated status 154 on display 150. In other embodiments, computer 130 generates an updated status window 154 responsive to a locally trapped hotkey.

According to various embodiments, display 150 is one or more of: a Liquid Crystal Display (LCD) display; a Cathode Ray Tube (CRT) display; a plasma display; any other type of display capable of displaying the one or more images; and any combination of the foregoing. For example, in some embodiments, display 150 is an SXGA display supporting a resolution of 1280×1024. In other examples, display 150 supports one or more of the VGA, HDTV, UXGA, QXGA, WXGA and WQXGA display standards. In one or more embodiments, display 150 provides a separate means for session status indication alternative to overlay status window 154, for example as dedicated session status LED under the control of host computer 130 using a control channel capability of the display connection such as an extended Display Data Channel (DDC) capability. In an exemplary embodiment wherein progressive image transmission is employed to display critical image data such as high resolution medical images or financial information, an LED indicator provides indication of when the decoded image 152 is a lossless representation of the display image rendered at host computer 110.

FIG. 2 illustrates selected details of host computer 110 of FIG. 1. Host computer 110 comprises CPU sub-system 200, image encoder 112 (also depicted in FIG. 1), support circuits 202 and network interface 204 connected by one or more buses such as one or more PCI, PCI-EXPRESS, HYPER-TRANSPORT and/or other system bus or peripheral bus known to the art. In an embodiment, CPU sub-system 200 comprises one or more CPUs connected to memory and Graphics Processing Unit (GPU) by a chipset and well known local bus structure such as one or more PCI or PCI-Express buses, HYPERTRANSPORT interconnects, memory buses, Accelerated Graphics Port (AGP) and the like. In other embodiments, graphics processing functions are executed by the chipset or the CPU. Examples of a well known suitable CPU include 32-bit, 64-bit or other CPU such as PHENOM, OPTERON or ATHLON class microprocessors manufactured by AMD, ITANIUM, XEON, ATOM, PENTIUM, CELERON or X86 class processors manufactured by Intel, SPARC microprocessors manufactured by Sun Microsystems Inc. or microprocessor such as a POWERPC processor manufactured by Motorola. However, any other suitable microprocessor platform may be utilized. Memory associated with CPU sub-system 200 comprises any one or combination of volatile computer readable media (e.g., random access memory (RAM), such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, system memory may incorporate electronic, magnetic, optical, and/or other types of storage media. The memory of CPU sub-system 200 stores host software such as application software, operating system, drivers and the like.

In various embodiments, CPU sub-system 200 executes well known software such as an operating system (e.g. WINDOWS XP or WINDOWS VISTA software from MICROSFT corporation, LINUX software available from various vendors or MAC OSX available from APPLE Corporation), driver software and application software such as word processing software, spreadsheets, CAD software, engineering tools, financial services software or the like. In some embodiments, sun-system 200 executes a Hypervisor such as ESX or GSX from VMWARE corporation, XENSERVER from CITRIX corporation or other Hypervisor. In some embodiments that support communication of USB information between host computer 110 and client computer 130 (such as between mouse 142 or keyboard 144 and host computer 110 (ref. FIG. 1)), CPU sub-system 200 comprises peripheral device bridging software such as USB Request Blocks (URB) bridging software known to the art.

Generally, image encoder 112 is an image encoder that uses one or more encoding techniques to encode an image stream such as a stream of encoded pixels or encoded drawing commands from CPU sub-system 200. In one or more embodiments, image encoder 112 is implemented in one or more software modules, Application Specific Integrated Circuit (ASIC), Field Programmable Gate Array (FGPA) or any combination thereof. An embodiment of encoder 112 is depicted in FIG. 3.

In various embodiments, support circuits 202 include cache, power supplies, local buses, interconnect chips, clock circuits, data registers, I/O interfaces, storage elements, local peripheral device interfaces and the like. Further, interconnects may include address, control, interrupt and/or data connections, controllers, data buffers, drivers, repeaters, and receivers to enable appropriate communications among CPU sub-system 200, image encoder 112 and network interface 204.

Network interface 204 connects to network 120 (ref. FIG. 1) and communicates encoded image data and other image information to client computer 130. In one or more embodiments, network interface 204 also facilitates the exchange of device-related data structures such as URBs between CPU sub-system 200 and client computer 130 (re. FIG. 1). In an embodiment, network interface 204 provides compatibility with network 120 by executing a reliable protocol stack such as TCP/IP.

It will be appreciated by those of ordinary skill in the art that in some embodiments, host computer 110 further comprises mechanical housing components, connectors, power supplies, and the like not depicted in FIG. 2.

FIG. 3 illustrates selected details of an embodiment of an image encoder 112 depicted in FIG. 1. In an embodiment, encoder 112 comprises transform module 300, scale and quantization module 302, encoder memory 304 and entropy encoder 306 coupled by bus 308 such as a Peripheral Component Interconnect (PCI) bus; a PCI-EXPRESS bus; a HyperTransport bus; an Advanced Microprocessor Bus Architecture (AMBA) bus; and any other connections, including wired, wireless, and optical connections. Encoder 112 is coupled to CPU-sub-system 200 of FIG. 2 by a bus such as a DVI bus, a PCI-EXPRESS bus; a HyperTransport bus or the like. In some embodiments, bus 308 includes communications elements, such as controllers, data buffers and/or registers, drivers, repeaters, and receivers. In various embodiments, bus 308 includes address, control, and data connections to enable communications among components of encoder 112.

Image encoder 112 performs image encoding operations, such as one or more of image type decomposition, transforming, progressive quantization, image difference calculations for residual encoding, and entropy encoding. In some embodiments, image encoder 112 is implemented, at least in part, as a set of computer-executable instructions in memory 304 or CPU sub-system 200. According to various embodiments, image encoder 112 includes one or more of: a programmable embedded digital media processor, such as a TMS320DM64x DAVINCI digital media processor available from Texas Instruments; a PNX1300 NEXPERIA processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing.

In some embodiments, transform module 300 receives an image or image section from the CPU sub-system and executes, for example, one or more lossy and/or lossless two dimensional image transform such as a progressive wavelet transform, a progressive Discrete Cosine Transform (DCT), a Discrete Wavelet Transform (DWT), a Discrete Cosine Transform (DCT), a Discrete Fourier Transform (DFT) or an alternative comparable image transform. In some embodiments, transform module 300 comprises a decomposition filter that decomposes images prior to transformation. In some such embodiments, frames, sub-frames such as blocks or other defined image regions are decomposed into different image types such as background, text, picture, video or object layers based on spatial and temporal features such as contrast, color content or other suitable parameters. According to some embodiments, images are further decomposed into different layers based on text recognition methods known to the art or analysis of drawing commands executed by CPU sub-system 200 in FIG. 2, such drawing commands providing attributes that enable image areas to be classified as video, text, background, icons, photographs or other elements typical of a graphic user interface. In some embodiments, image information associated with the image type or attributes such as source frame rate or classification information is communicated to client computer 130 (ref. FIG. 1) so that transmission status and/or decoded image quality can be assessed based in part on the image information.

In various embodiments, the image coefficients output from transform module 300 are used as input data by scale and quantize module 302, which scales and quantizes the image, for example according to a desired progressive build state. In one or more embodiment, scale and quantize module 302 reduces a number of bits of the resulting transformed coefficients by reducing a precision for each resulting transformed coefficient (for example by dividing coefficient magnitudes by a quantization factor and rounding the result, such as by rounding down). Progressive encoding is accomplished by encoding a highly quantized image display and then, increasing a quality of the highly quantized image display by successively adding coefficient refinement information using various quantization techniques.

In an exemplary embodiment using progressive encoding, a copy of the quantized image transmitted to computer 130 in FIG. 1 is also stored in memory 304 so that the quantized image can be used to determine coefficient refinement or other progressive build information required for a subsequent update of the image. In such an embodiment, encoder 112 is enabled to conduct any of several comparisons between the transmitted image and the source image rendered at the host computer to generate encoding quality metrics, including comparison of refinement level, error analysis (e.g., Peak Signal-to-Noise Ratio (PSNR) comparison), comparison of frame rate between the source and encoded images or comparison of display resolution (i.e. 2D pixel dimensions) between the source and encoded images. One or more encoding quality metrics are communicated to computer 130 and used to present image quality in terms of a difference between the actual display image and the intended display image source.

In some embodiments, control parameters are applied to influence the quantization function in order to lower a latency or increase a quality of one or more specified regions. In one embodiment, low latency is accomplished by setting aggressive coefficient values in one or more quantization tables so that compressed region updates consume a limited available bandwidth. As a result, the one or more specified regions of the image display are prioritized. High quality is accomplished by minimizing quantization to produce perceptually lossless or near-lossless representations of the image display. In further embodiments and/or usage scenarios where the progressive build state is an initial build state for a new image, the quantization factor is set such that output coefficients from scale and quantize module 302 are zero.

According to various embodiments, the quantized data from scale and quantize module 302 are used as input data by entropy encoder 306 which further compresses the quantized values using lossless coding methods such as at least one of a Golomb encoder, Rice encoder, Huffman encoder, variable length encoder (VLC), context-adaptive VLC or context-adaptive binary arithmetic encoder (CABAC)) for lossless compression of the encoded bit stream.

Encoder memory 304 stores at least one of input image data, compressed image data, image information such as progressive build state information, frame sequence information, encoding quality parameters, information related to intermediate encoding steps or image mask information that specifies unchanged image regions associated with a previous image transmission. In various embodiments, image encoder 112 shares memory resources associated with CPU-subsystem 200 in FIG. 2. For example, in some embodiments system memory and/or drawing memory share memory resources with encoder memory 304. In various embodiments, encoder memory 304 includes random access memory (RAM), such as DRAM, SRAM, XDR RAM, DDR RAM, video DRAM etc.

One particular embodiment of a technique for performing progressive encoding of an image in a remote computing environment is disclosed in commonly assigned U.S. patent application Ser. No. 11/549,577, filed Oct. 13, 2006 and incorporated herein by reference in its entirety. In one embodiment, the encoding process is adjusted in view of available resources such as, computer processing speed, network bandwidth and the like.

FIG. 4 illustrates select details of an embodiment of a client computer 130 in FIG. 1. In one or more embodiments, computer 130 comprises image decoder 132, processor 400 with memory 410, display interface 420, network interface 430, support circuits 440, and device interface 450, communicatively coupled by bus 402. In various embodiments, memory 410 comprises session monitor 134 and status table 412. It will be appreciated by those of ordinary skill in the art that in an embodiment such as a thin client or desktop PC, computer 130 also comprises mechanical housing components, connectors, power supplies, and the like not shown in FIG. 4.

In some embodiments, computer 130 is implemented, at least in part, as a processor, a computer system, and/or a programming or a processing environment configured to receive and to decode display images such as a sequence of image frames, image regions or one or more progressively encoded image streams. According to various embodiments, computer 130 also includes one or more of: Human Interface Devices (HIDs); peripheral components, such as microphones or speakers; other interfaces, such as a USB interface; and other components, interfaces, and/or connections associated with computer systems, desktop computers, and/or processors. In some embodiments, computer 130 is implemented as a stand-alone system, such as a thin client or a desktop computer. In some embodiments, such as some stand-alone embodiments, computer system 130 also includes mechanical housing components, connectors, power supplies, and other components not illustrated in FIG. 4. In various embodiments, computer 130 is a processing module integrated in an appliance, such as a phone or a display. In such integrated embodiments, computer 130 is optionally configured to use resources, such as power supply and mechanical support components, provided by the appliance or the display.

According to various embodiments, bus 402 is one or more of: a Peripheral Component Interconnect bus; a PCI-Express™ bus; a HyperTransport™ bus; an Advanced Microprocessor Bus Architecture (AMBA®) bus; and any other connections, including wired, wireless, and optical connections, for coupling components of computer 130. In some embodiments, bus 402 includes communications elements, such as controllers, data buffers and/or registers, drivers, repeaters, and receivers. In various embodiments, bus 402 includes address, control, and data connections to enable communications among components of computer 130. According to various embodiments, bus 402 is one or more of: a single bus; a plurality of independent busses, with some of the components of computer 130 coupled to more than one of the independent busses; a plurality of bridged busses; a fabric, such as HyperTransport™ or InfiniBand™ and any other one or more busses configured to couple the components of computer 130.

Processor 400 is a microprocessor, microcontroller or logic sequencer enabled to provides control and/or management functions for computer 130 and further enabled to execute session monitoring functions provided by session monitor 134. Examples of processor 400 include those manufactured by Microchip; a 32-bit CPU; a 64-bit CPU; an AMD CPU, such as an Opteron™ or Athlon™ CPU; an Intel CPU, such as a Peryn™, Xeon™ or Pentium or other x86 CPU; a SPARCT™ microprocessor, such as those manufactured by Sun Microsystems Inc.; a PowerPCT™ microprocessor, such as those manufactured by Motorola or IBM; and any other processor or computing device. In some embodiments where computer 130 includes an ASIC or an FPGA, processor 400 includes a processor embedded in the ASIC or the FPGA, such as a MIPS, ARM, or another type of embedded processor.

In an embodiment, processor 400 writes a display overlay to a region of an output frame buffer, for example as stored in memory 410 or other memory associated with display interface 420 or the output domain of decoder 132. The overlay is in turn presented as status overlay 154 in FIG. 1. In some embodiments, status overlay 154 is an image alpha-blended with image 152 in FIG. 1 after the display image is obtained from a frame buffer and prior to display of the display image by display 150 in FIG. 1. In one or more embodiments of computing system 100 in FIG. 1, decoder 132 relieves computer 130 of significant computation functions. In some such embodiments, processor 400 is generally a microcontroller that facilies session monitoring and system management functions such as initialization, Input/Output processing, and network communications.

According to various embodiments, processor 400 initializes one or more of: bus 402, network interface 430, image decoder 132, memory 410, display interface 420, device interface 450 and other components of computer 130. In some embodiments, processor 400 establishes a management connection with host computer 110 of FIG. 1 to enable communication of management information, such as image build state, status updates, error reports, encoding information and peripheral device data. For example, in some embodiments, network interface 430 provides, at least in part, a first network connection (such as a TCP/IP socket) for receiving image data, and a second network connection for the management and peripheral data connection. In some embodiments, the image build state and/or other encoding quality metrics are sent along with the image data on the first network connection. In other embodiments, the image build state is sent, at least in part, on the management and peripheral data connection.

According to one or more embodiments, processor 400 is coupled to memory 410. Memory 410 comprises random access memory, read only memory, removable disk memory, flash memory such as one or more of: electronic, magnetic, optical, and/or other types of storage media; volatile computer-readable media, such as RAM, DRAM, SRAM, DDR RAM or XDR RAM; and nonvolatile computer-readable media, such as ROM, hard drive, tape, CDROM, DVDROM, magneto-optical disks, EPROM, EEPROM, Flash EPROM or various combinations of these types of memory for storing data and/or computer-readable instructions. Memory 410 stores various software, firmware and/or data structures including session monitor 134 and status table 412. In various embodiments, memory 410 stores information such as received image and progressive build state information, decoded image information, decoded raster image information in a format accessible to display interface 450, and information associated with processor 400, such as software and/or data used by processor 400. In various embodiments, memory 410 is partitioned and/or distributed. For example, in some embodiments, memory 410 is partitioned into a plurality of partitions, such as system and frame buffer partitions, and the frame buffer partition is accessible by display interface 420. In various embodiments, memory 410 uses different busses for coupling with network interface 430, processor 400, decoder 132, display interface 420, device interface 450 and/or other components of computer 130. In further embodiments, memory 410 includes control logic for arbitrating access to memory 410 among the components of computer 130.

In various embodiments, display interface 420 accesses display information, such as decoded raster image information and status overlay information from memory 410 and/or image decoder 132, and provides a display signal, such as a raster signal, for display 150 in FIG. 1 using a display signaling protocol. In some DVI embodiments, display interface 420 includes line driver circuitry such as Transition-Minimized Differential Signaling (TMDS) circuitry. In other embodiments, display interface 420 includes one or more VGA or DISPLAYPORT controllers and use alternative display protocols such as DisplayPort, Digital Packet Video Link (DPVL), HDMI or the like. In other embodiments, display interface 420 provides a discrete signal interface such as an LED interface for status indication.

In various embodiments, network interface 430 receives an encoded image stream from host computer 110 (ref. FIG. 1) for decoding and presentation. In some such embodiments, network interface 430 communicates device data such as USB Request Blocks (URBs) associated with peripheral devices such as mouse 142 and keyboard 144 (ref. FIG. 1) to host computer 110. In one embodiment, the network interface 430 provides compatibility with the network 120 (ref. FIG. 1) by executing a reliable communication protocol such as TCP/IP.

Support circuits 440 include at least one of power supplies, clock circuits, data registers, I/O interfaces, network interfaces, and the like. The support circuits 440 support the functionality of bus 402, decoder 132, memory 410, display interface 420, network interface 430, device interface 450 and other components of computer 130.

In various embodiments, device interface 450 terminates various peripheral devices such as mouse 142 and keyboard 144 in FIG. 1. In a USB embodiment, device interface 450 comprises one or more USB host controllers, PHY circuitry and connectors. In another USB embodiment, device interface 450 comprises a bus controller compliant with Open Host Controller Interface (OHCI) specifications, including OHCI specification revision 1.0a published by COMPAQ, MICROSOFT and NATIONAL SEMICONDUCTOR. In another embodiment, the device interface 450 is compliant with Enhanced Host Controller Interface (EHCI) specifications, including EHCI Specification Revision 1.0 published by INTEL CORPORATION. In yet another embodiment, device interface 450 is compliant with Universal Host Controller Interface (UHCI) specifications. In other embodiments, the device interface 450 complies with IEEE1394/Firewire Host Controller specifications, Wireless Host Controller (WHCI) specifications or others. In other embodiments, the device interface 450 is compliant with a plurality of host controller specifications comprising one or more OHCI/EHCI specifications. Other embodiments comprise interfaces compatible with other peripheral bus specifications such as RS-232, Bluetooth, Firewire, IEEE 802.11 and the like. In an embodiment, device interface 450 is supported by suitable bus controller driver software, mid-layer USB-over-IP packetization software and/or device drivers such as USB host controller drivers (HCD), USB core drivers and stub driver enabled to communicate device data to compatible driver software on host computer 110 in FIG. 1, for example by exchanging USB Request Blocks (URBs), or higher level I/O commands such as ITU T.120 compliant I/O communications, MICROSOFT Remote Desktop Protocol (RDP) CITRIX Independent Computing Architecture (ICA) or the like with compatible drivers or application software in CPU subsystem 200 in FIG. 2. Such bus controller driver software is stored as a set of machine readable instructions in memory 410 and executed by a processor such as processor 400 or a processing function local to device interface 450.

In various embodiments, image decoder 132 is enabled to execute image decoding operations that convert an encoded image stream received from host computer 110 to a decompressed image format such as a raster image format suitable for transmission using a communications medium such as a VGA or DVI cable to display 150 (ref. FIG. 1) for presentation to a user as a display image. The encoded image sequence is received from interface 430 and then decoded, for example using a progressive decoding pipeline or rendering engine in the case that encoded drawing commands are received from host computer 110. In some embodiments where encoded pixel data is received, image decoder 132 is enabled to decode the pixel data, for example by applying inverse transform functions such as progressive decoding, inverse wavelet or inverse DCT transformation and/or video decoding. In further embodiments, decoder 132 is implemented, at least in part, as a set of computer-executable instructions. According to various embodiments, decoder 132 includes one or more of: a programmable embedded digital media processor, such as a TMS320DM64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image decoding; and other processors and/or electronic hardware suitable for performing image decoding; software executing on and/or in conjunction with a processor, including any of the foregoing; and any combination of the foregoing. An embodiment of an image decoder is 132 is depicted in FIG. 5 and described later herein.

Session monitor 134 comprises a set of machine executable instructions, a logic circuit or a combination thereof enabled to use image information to perform session monitoring and indication methods based on the status of image data received from host computer 110 in FIG. 1. In one or more embodiments, session monitor 134 uses Human Input Device (HID) event information from device interface 450 to provide timing and display region identification information to support such session monitoring functions. In other embodiments, session monitor 134 parses encoding quality metrics provided by host computer 110, determines the accuracy of the display data with respect to the source image and generates a representative quality indication for display as status 154 (in FIG. 1). As an alternative, host computer 110 determines the accuracy of the encoded display data with respect to the source image and session monitor 134 translates accuracy information received from host computer 100 into a representative quality indication for display. An embodiment of a session monitoring process is depicted by process 600 in FIG. 6 and described below.

In various embodiments, status table 412 maintains image status and quality information used to determine whether an image frame or region exceeds one or more determined quality thresholds. In some such embodiments, regions of a display image are dynamically associated with quality thresholds based on image attributes such as image content type (video, picture, background, text types etc. provided by encoder 112 in FIG. 1) and/or HID activity level provided by device interface 450 or host computer 110 in FIG. 1. Session monitor 134 further maintains the current quality of one or more regions in table 412 and notifies the user of quality status using a display overlay. An embodiment of table 412 is presented as Table 1 below.

FIG. 5 illustrates selected details of an embodiment of image decoder 132 in FIG. 4. Image decoder 132 comprises entropy decoder 500, inverse scale and quantize module 502 and inverse transform function 504 coupled by bus 508. In an embodiment, bus 508 is a data bus such as a Peripheral Component Interconnect (PCI) bus; a PCI-EXPRESS bus; a HYPERTRANSPORT bus; an Advanced Microprocessor Bus Architecture (AMBA) bus; and any other connections, including wired, wireless, and optical connections. Decoder 132 is coupled to other processing elements of computer 130 in FIG. 4 by a bus such as an AMBA bus, a PCI-EXPRESS bus; a HYPERTRANSPORT bus or the like. In some embodiments, bus 508 includes communications elements, such as controllers, data buffers and/or registers, drivers, repeaters, and receivers. In various embodiments, bus 508 includes address, control, and data connections to enable communications among components of decoder 132.

Entropy decoder 500 recovers quantized transform coefficients and/or refinement information associated with encoded display frames or regions by executing an inverse entropy transformation function that matches an entropy encoder function (e.g., the entropy encoder function 306 in FIG. 3). According to various embodiments, the entropy decoder performs one or more of: entropy arithmetic decoding; or a lossless data decompression technique. According to various embodiments, the entropy decoder is implemented as one or more of: a logic circuit; software executed on a processor; and any combination of the foregoing. In some embodiments where entropy decoding is implemented, at least in part, in software, at least some functions are executed as a set of instructions by processor 400 in FIG. 4. In some embodiments where an entropy decoder is implemented, at least in part, as a logic circuit, the entropy decoder resource is physically co-located with the transform module, such as by being on a same integrated circuit.

The inverse scale and quantize module 502 scales the decoded transform coefficients in preparation for inverse transformation performed by inverse transform module 504. In one embodiment, one or more quantization tables are adjusted according to one or more control parameters such as an image quality specification. The image quality specification is communicated from a host computer (e.g., the host computer 110 as illustrated in FIG. 1) to a second computer (e.g., the client computer 130 as illustrated in FIG. 1) so that the matching quantization tables are selected for use by the inverse quantization module 502. In some embodiments, the quantized coefficients from a previous image display is stored by image decoder 132 and added to progressive refinement updates prior to inverse quantization. In other embodiments, the image decoder comprises a forward transform and quantization functions comparable to transform and quantization functions of an image encoder. These functions re-transform the current image display accessed from a local frame buffer for example so that progressive refinement updates can be added to the coefficients prior to inverse quantization.

Inverse Transform function 504 executes an inverse linear transform such as an inverse wavelet or inverse DCT transform corresponding to the forward transform function 300 in FIG. 3 and produces a decoded image (e.g., decoded image frames or regions). In one embodiment, image display updates (e.g., region updates) are stored in an image buffer (e.g., in a buffer associated with memory 506 or memory 410 in FIG. 4).

Memory 506 comprises random access memory, such as one or more of: DRAM, SRAM, DDR RAM, XDR RAM or the like. In an embodiment, memory 506 stores data associated with image decoding such as intermediate decoding results, progressive decode state information, image mask information, image sequence information, previous image state information and previously received image data, such as previously decoded image data associated with a previous progressive build state. In various embodiments, memory 506 is a separate memory to memory 412 in FIG. 4, one or more partitions of memory 410 in FIG. 4 or the same memory as memory 410 in FIG. 4.

In some embodiments where client computer 130 includes processor 400 (such as a CPU, a microprocessor, a microcontroller, or a programmable media processor), resources of processor 400 are used, at least in part, to implement one or more functions of components of image decoder 132, such as functions of entropy decoder 500, inverse scale and quantize module 502 and inverse transform module 504.

In some embodiments, various combinations of all or portions of functions performed by a computer (such as computer 110 of FIG. 1 or computer 130 of FIG. 1), including image encoder 112 or image decoder 132 and portions of a processor, a microprocessor, or a programmable controller providing all or portions of the aforementioned functions, are specified by descriptions compatible with processing by a computer system (e.g. Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

Figure 6:
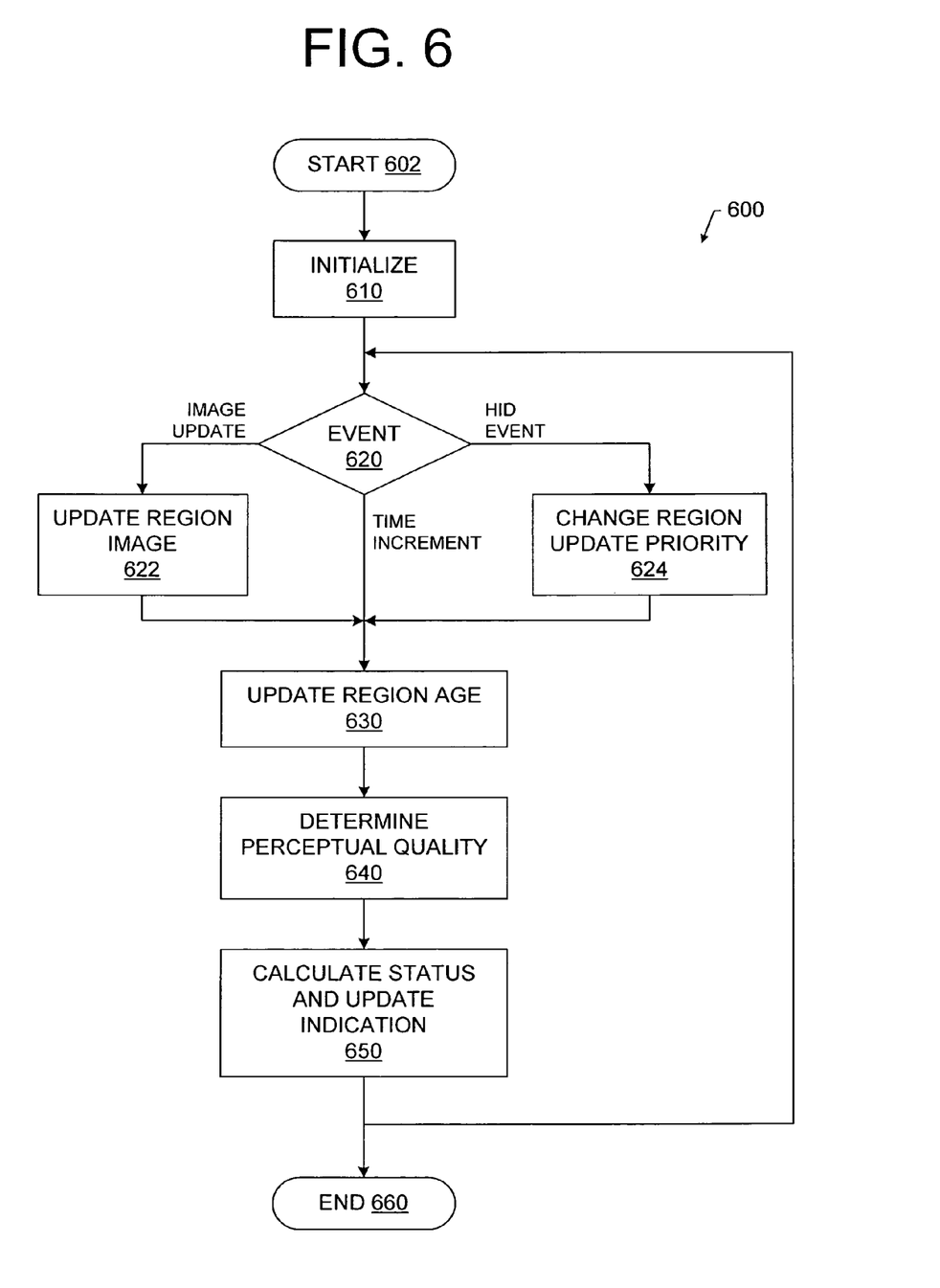
FIG. 6 illustrates an embodiment of a process for determining the perceptual quality of a display image and providing session status indications.

FIG. 6 is a flow diagram of method 600 which is an embodiment of a process for determining the perceptual quality of a display image and providing indications of session status information such as perceptual quality status. In an exemplary embodiment, perceptual quality status related to a source image at a first computer (ref. host computer 110 in FIG. 1) is displayed at a second computer (ref. client computer 130 in FIG. 1). In an embodiment, method 600 repeatedly calculates a qualitative Perceptual Quality (PQ) score based on recent input events such as recent image updates or recent HID events and presents indications of the resultant PQ. In another embodiment, the PQ for a region of the display is presented to a user on the display in the form of an overlay graph if it decays below a defined threshold value.

In an embodiment, PQ is based on objective quality (OQ), region age and weighting factors. OQ is a quantitative measurement of image quality such as a PSNR measurement or number of refinement levels of a progressively transmitted image or an expected frame rate. In an embodiment, PQ is assigned on a regional basis according to attributes of each region such as image type or presence of HID events for the region.

In the case of a progressively decoded image:

$$PQ_{PRESENT} = f(OQ, W_x, L) \text{ for region not updated} \quad (1)$$

where
$PQ_{PRESENT}$ is the new PQ for the region;
OQ is the Objective Quality for the recently decoded region;
$W_x$ is a weight selected from a set of weights according to subjectively or empirically derived according to subjective requirements such as system latency and/or display image update rate;
L is the present age of the region;

e.g. L=1 when a region is updated or an HID event is registered in a region. Then L=2 after a specified persistence period, for example after a period related to the display update rate has elapsed and no update has occurred. One example of a suitable persistence period is a display refresh period such as a 16.7 ms period associated with a 60 Hz refresh frequency.

In an exemplary embodiment $$PQ_{PRESENT} = OQ - (W_x \times L^N) \text{ if } OQ < OQ_{MAX} \quad (2)$$

$$PQ_{PRESENT} = OQ \text{ if } OQ = OQ_{MAX} \quad (3)$$

where
$PQ_{PRESENT}$ is the new PQ for the region;
OQ is the Objective Quality for the most recent decoded region;
$OQ_{MAX}$ is a defined maximum OQ such as a perceptually lossless or numerically lossless image quality level;
$W_x$ is a weight selected from a set of weights according to the attributes of the region;
L is the present age of the most recent decoded region; and
N is the perceptual quality deterioration factor. In an embodiment, N is associated with image type information such that the PQ of a lossy high contrast image type such as text deteriorates quickly while the PQ of a picture image type deteriorates slowly. In another embodiment, N is associated with the presence or absence of HID information in a region such that in the absence of new image information, the PQ of a region with recent HID activity deteriorates more quickly than a region without HID activity.

Method 600 begins at step 602 and continues to step 610 ('Initialize') during which session monitoring is initialized. Step 610 includes initialization of input parameters associated with a PQ calculation such as equations (2) and (3) and initialization of data structures such as status table 412 in FIG. 4. In some embodiments, the status table comprises configurable perceptual quality threshold information loaded from local memory, or received from another computer such as the host computer or an administration server. In an embodiment, present age (L) for PQ calculations is set and initialized, an initial $PQ_{PRESENT}$ is established and a status indication is initialized, for example a display overlay region or LED indicator is cleared of previous session status information.

As a next step 620 ('Event'), method 600 checks for recent events that impact the result of an updated $PQ_{PRESENT}$ calculation. If new or updated image information is received, the display image is updated as step 622 ('Update Region Image'), including setting an updated OQ associated with the new or updated image. In this case, method 600 proceeds to step 630 ('Update Region Age') where the present age of the image (L) is reset to reflect an initial age for the image region. The updated L value is stored for future reference, for example using status table 412 in FIG. 4.

If step 620 concludes that no new or updated image information is received and a time increment has occurred, the previously stored present age (L) is retrieved and updated, in step 630. In an embodiment, different regions of an image maintain independent present age information, for example stored separately in the status table.

In one or more embodiments, step 620 also monitors HID events such as mouse or keyboard activity associated with one or more regions. If a change in activity is detected, the priorities of the associated region(s) is increased as step 624 ('Change Region Update Priority'), for example by increasing deterioration factor N in equation (2). In this case, method 600 proceeds to step 630 ('Update Region Age') where the present age of the image (L) is incremented from its previous value and restored in the status table for future reference. In an embodiment where step 620 monitors HID events associated with a region, deterioration factor N is reset to a default region deterioration factor in the case of new image information received for the region (ref step 622).

The perceptual quality for the region is calculated as a next step 640. In an embodiment, $PQ_{PRESENT}$ is updated according to equations (2) or (3) using input parameters from step 630 and steps 622 or 624 above. In one or more embodiments, the equations and constants that determine $PQ_{PRESENT}$ are adjustable. As one example, adjustments are made at the client computer. As another example, adjustments are received as commands over the network from host computer 110 or another computer such as a server.

In another embodiment, the client computer determines a time base with respect to the host computer and a perceptual quality is determined according to deviation of image frames with respect to the local clock at the client computer. For example, in an embodiment where a constant frame rate is expected, a client clock is initialized each time a frame is received and a perceptual quality threshold is triggered when the next frame exceeds an expected delay. In an embodiment, image decoder 132 in FIG. 1 comprises the client clock and tracks frame timing.

In other embodiments the encoded image stream from the host computer comprises out-of-band image encoding information such as encoding quality metrics, progressive build parameters or number of frames intentionally dropped in order to limit communication bandwidth. In such an embodiment, the perceptual quality is set according to the out-of band parameters.

In another embodiment, image frames from the host computer comprise image sequence information and a perceptual quality threshold is triggered when a frame is dropped or received out of order. In other embodiments, a perceptual quality threshold is triggered in the presence of persistent out-of-order or dropped frames. In another embodiment, a perceptual quality threshold is triggered when one or more updates associated with the progressive transmission of a single frame (i.e. progressive build updates are delayed, received out of order or dropped.

In another embodiment the host computer indicates regions of image that have different aging considerations such as a video stream received over the Internet. Content that is less sensitive to latency considerations remains at a lower quality for extended periods of time without dropping below an acceptable $PQ_{PRESENT}$ value.

In another embodiment, display tearing artifacts that reduce the perceptual quality are monitored. A record of decode and frame update events for different image regions is maintained, for example using a table accessible by the processor or decoder. If a region of the image is not received in time to be displayed in the same frame update of other associated regions, the resultant display "tear" is detected as a tearing event which is used as an input parameter to the $PQ_{PRESENT}$ calculation. A perceptual quality threshold is triggered after a torn frame or in presence of persistent frame tearing events.

The status for the region is calculated and displayed as next step 650 ('Calculate Status and Update Indication'). In an embodiment, a perceptual quality threshold for an image or a region is retrieved from the status table (ref table 412 in FIG. 4) and compared with $PQ_{PRESENT}$ for the region calculated as step 640 ('Determine Perceptual Quality').

In one embodiment, a status indication such as an icon is displayed only in the case that $PQ_{PRESENT}$ falls below the threshold. In another embodiment, a status indication is displayed in case that $PQ_{PRESENT}$ is above the threshold.

In another embodiment, a status indication such as a bar graph is proportional to the difference between $PQ_{PRESENT}$ and a threshold, for example presenting a "high quality" image status indication in the case when $PQ_{PRESENT}$ is above a threshold, a second "acceptable image" status indication (e.g. when $PQ_{PRESENT}$ is between an "acceptable PQ" and an "unacceptable PQ" threshold and an "unacceptable image" status indication when $PQ_{PRESENT}$ is below an "unacceptable PQ" threshold. One example is to have a color status indication overlay 154 in FIG. 1 presented as a bar on the bottom of the display image. In such an embodiment overlay 154 is enabled to disappear when the image is lossless, a short green bar is presented if display updates become perceptually lossless in less than 100 ms, an amber bar is presented if display updates become perceptually lossless in less than 200 ms and a red bar is presented if the packets are lost and a perceptually lossless state is delayed beyond 200 ms. In some embodiments, the status representation may be configurable. For example, a variation in the above configuration displays a bar graph whenever the display image is not lossless. Such a configuration helps the user understand if the delay is associated with the host computer or the connection between the host and client computers.

In another embodiment, a status indication is displayed as a cursor attribute. In an exemplary embodiment, processor 400 in FIG. 4 programs a sprite setting of the display controller according to the perceptual quality. For example, a cursor changes to amber when a first threshold is exceeded and red when a second threshold is exceeded.

In other embodiments, network bandwidth and packet loss are determined, for example by network interface 430 (ref. FIG. 4). Network parameters are presented as status overlays when bandwidth, packet loss or latency exceeds pre-determined limits.

In another embodiment, peripheral device information such as latency and/or network bandwidth consumption are determined for device communications between the host and client, for example by network interface 430 in FIG. 4 in conjunction with device interface 450 (also in FIG. 4). The peripheral device information is then presented as an overlay indication on the display.

In one or more embodiments, an indication that $PQ_{PRESENT}$ exceeds a predefined threshold is indicated by an alpha blended overlay of the entire display or an overlay over the offending region. In the case of an overlay, the image continues to be updated. The overlay is removed when the $PQ_{PRESENT}$ changes to a value within the acceptable defined threshold.

In another embodiment, $PQ_{PRESENT}$ threshold events are communicated over network 120 to a monitoring computer which is programmed to identify operation of the remote computer system outside of predefined characteristics.

According to an embodiment, status indication is further determined by out of band information such as connection health and latency information received from the host computer or connection manager. In the absence of a reliable connection or in the presence of high connection latency (even in the absence of display image updates), a status indication presents the connection latency.

According to one or more embodiments, method 600 loops at a suitable time base, such as a rate proportional to the expected display refresh rate. Method 600 ends at step 660, for example when an intentional disconnect command with the host computer is successfully completed.

Table 1 below is an exemplary embodiment of status table 412 in FIG. 4.

TABLE 1

Status Table

| REGION ID | Region Age (L) | Region Quality Threshold |
|---|---|---|
| R1 | L1 | Q1 |
| R2 | L2 | Q2 |
| R3 | L3 | Q3 |
| R4 | L4 | Q4 |

The exemplary embodiment describes a display comprised of four regions R1 ... R4. Other embodiments comprise fewer or more regions. Regions R1 ... R4 identify regions of a display image, for example static segments (e.g. strips or blocks of the display surface) or dynamic segments associated with display features such as image type detected by the decoder or specified by the host computer. Region age values L1 ... L4 are stored for each region according to the number of time increments elapsed since the region was last updated. The region quality threshold values Q1 ... Q4 are PQ thresholds for each region used in status calculations such as step 650 in FIG. 6. In some embodiments, quality threshold values Q1 ... Q4 are configurable as described.

While the foregoing is directed to embodiments of the present invention, other and further embodiments of the invention may be devised without departing from the basic scope thereof, and the scope thereof is determined by the claims that follow.

The invention claimed is:

1. A method of presenting display status information, comprising:
    receiving, at a client computer, from a host computer remotely located with respect to the client computer, refinement data of an unchanged portion of a plurality of spatial portions of a source image at the host computer;
    updating display image data, displayed by the client computer, by accumulating the refinement data with a corresponding spatial portion of the display image data; and
    updating a presentation that indicates a reproduction quality of the display image data with respect to the source image, wherein the presentation is updated, in response to updating the display image data, to indicate a user's perceptual quality of the updated display image data, wherein the presentation is determined based on a system latency of the host computer and the client computer, wherein the reproduction quality comprises an assembly of reproduction quality information associated with each spatial portion of the plurality of spatial portions, wherein the reproduction quality information comprises static picture image reproduction accuracy information and temporal information comprising a period since the source image last changed, and wherein a format of the presentation is based on a difference between a qualitative perceptual quality score and plurality of quality thresholds.

2. The method of claim 1, wherein the updated display image data is a lossless reproduction of the source image, and the presentation is changed from an indication of a lossy reproduction to an indication of a lossless reproduction of the source image, wherein the indication of the lossless reproduction occurs when a displayed quality status indicator disappears.

3. The method of claim 1 wherein the refinement data is a step in a sequence of progressively received image data accumulating to a lossless reproduction of the source image.

4. The method of claim 1, wherein the unchanged portion is the only update received for an associated frame of the source image.

5. The method claim of 1 further comprising partitioning the updated display image data into a plurality of blocks and maintaining quality information, the quality information comprising reproduction accuracy with respect to the source image, for each block of the plurality of blocks, wherein (i) the source image comprises a plurality of regions with independent update rates, (ii) the reproduction quality is determined from the reproduction accuracy of each block of the plurality of blocks, (iii) the refinement data comprises image refinement data for at least one of the plurality of blocks, and (iv) the presentation indicates a quality status as an aggregation of the quality information for each block of the plurality of blocks.

6. The method of claim 1 wherein the presentation comprises at least one of a cursor attribute, a graph, a dial, an overlay, an LED, an audio alarm or an icon.

7. The method of claim 1 wherein the reproduction quality is based on characteristics of a network connection between the client computer and the host computer comprising the source image.

8. The method of claim 1 wherein the client computer determines a time base with respect to the source image, wherein the reproduction quality is determined using the time base.

9. The method of claim 8 wherein the time base is at least partly determined by measuring a response time associated with a communication to the host computer comprising the source image.

10. The method of claim 9 wherein the response time is based on a time from an input, from a peripheral device event of the client computer, to receiving an update of the source image, the update of the source image rendered in response to the input from the peripheral device.

11. The method of claim 1 further comprising receiving image sequence information of the source image and, responsive to a sequence status associated with image sequence information, displaying an indication of the sequence status.

12. The method of claim 11 wherein the sequence status comprises at least one of a progressive image error or a dropped frame error.

13. The method of claim 1, further comprising:
    receiving initial data of a changed portion of the plurality of spatial portions, the changed portion from a same frame of the source image as the unchanged portion; and
    updating the display image data by replacing a spatial portion of the display image data, aligned with the changed portion, with the initial data, wherein updating the presentation is further based on the initial data.

14. The method of claim 13, wherein receiving the refinement data and the initial data comprises receiving encoded image data and decoding the encoded image data to produce the refinement data and the initial data.

15. An apparatus for presenting display status information, comprising:
    a processor;
    a client resource for receiving, from a host computer remotely located with respect to the client resource, refinement data of an unchanged portion of a plurality of spatial portions of a source image at the host computer; updating display image data, for display by the client resource, by accumulating the refinement data with a corresponding spatial portion of the display image data; and updating a presentation that indicates a reproduction quality of the display image data with respect to the source image, wherein the presentation is updated, in response to updating the display image data, to indicate a user's perceptual quality of the updated display image data, wherein the presentation is determined based on a system latency of the host computer and the client resource, wherein the reproduction quality comprises an assembly of reproduction quality information associated with each spatial portion of the plurality of spatial portions, wherein the reproduction quality information comprises static picture image reproduction accuracy information and temporal information comprising a period since the source image last changed, and wherein a format of the presentation is based on a difference between a qualitative perceptual quality score and plurality of quality thresholds.

16. The apparatus of claim 15 wherein the display image data comprises temporal status information with respect to changes to regions of the source image and wherein the reproduction quality is based on the temporal status information.

17. The apparatus of claim 15 wherein (i) the display image data is spatially divided into a plurality of regions, (ii) each region of the plurality of regions comprises a progressive build state identifying incremental quality improvements of the display image data associated with an unchanged region of the source image, (iii) the unchanged portion comprises a region of the plurality of regions, (iv) updating the display image data comprises updating the progressive build state of the region, (v) the reproduction quality is based on the progressive build state of each region of the plurality of regions, and (vi) the presentation indicates a quality status as an aggregation of the progressive build state for each region of the plurality of regions.

18. A system for generating display status information comprising:
   a host computer comprising an encoder for encoding refinement image data of an unchanged portion of a plurality of spatial portions of a source image; and
   a client computer for (i) receiving the encoded refinement image data from the host computer, (ii) updating display image data, for display by the client computer, by accumulating the refinement image data with a corresponding spatial portion of the display image data, and (iii) updating a presentation that indicates a reproduction quality of the display image data with respect to the source image, wherein the presentation is updated, in response to updating the display image data, to indicate a user's perceptual quality of the updated display image data, wherein the presentation is determined based on a system latency of the host computer and the client computer, wherein the reproduction quality comprises an assembly of reproduction quality information associated with each spatial portion of the plurality of spatial portions, wherein the reproduction quality information comprising a picture image reproduction accuracy information and temporal information comprising a period since the source image last changed, and wherein a format of the presentation is based on a difference between a qualitative perceptual quality score and plurality of quality thresholds.

* * * * *